United States Patent Office 3,014,888
Patented Dec. 26, 1961

3,014,888
STABILIZED HYDROCARBON COMPOSITIONS
James D. Shimmin, Little Sutton, Wirral, and Vivian A. Moffatt, Wirral, England, assignors to Shell Oil Company, a corporation of Delaware
No Drawing. Filed Dec. 11, 1958, Ser. No. 779,540
Claims priority, application Great Britain Dec. 20, 1957
5 Claims. (Cl. 260—45.8)

The present invention relates to hydrocarbon compositions which are stabilized against oxidation and color changes.

Many liquid and solid hydrocarbons tend to deteriorate due to oxidation resulting in the formation of undesirable and deleterious products which render them useless for their intended purposes within a relatively short period of time. Hydrocarbon materials subject to such deterioration include petroleum hydrocarbons having more than 5 carbon atoms and polymeric hydrocarbons prepared by the polymerization of monoolefins. These polymeric hydrocarbons, especially when prepared by the so-called low pressure process as described below, tend to degrade when there is no antioxidant present, and the addition of an antioxidant to offset this usually leads to undesirable color formation. The exact mechanism of this discoloration is not fully understood, but it is believed likely that in the case of the polymeric hydrocarbon materials prepared by the low pressure process, the discoloration is caused by minute traces of the catalyst remaining in the finished polymeric hydrocarbon material.

It is known that phenothiazine has antioxidant properties, and it and many of its derivatives have been suggested for use as antioxidants in synthetic lubricating oils such as di(2-ethylhexyl) sebacate, dinonyl sebacate, and dinonyl adipate.

However, phenothiazine and many of its derivatives have the disadvantage of forming a black precipitate when used in hydrocarbon oils because of instability in the presence of light. Thus, while phenothiazine has good antioxidant properties, light and catalyst such as the Ziegler type catalyst cause undesirable black coloration, and render phenothiazine unsatisfactory for many purposes. This is particularly the case with polyethylene and polypropylene where color is often the critical factor.

It has now been found, quite unexpectedly, that both oxidation stability and color stability of hydrocarbons can be improved by the addition of a minor proportion of a phenothiazine derivative which has benzyl or a substituted benzyl group in the 10-position.

It is an object of this invention to provide hydrocarbon materials having improved stability against oxidation and color deterioration. Another object of this invention is to provide a stabilized polymerization product of olefins, particularly polyethylene and polypropylene or mixtures thereof which have good color retention and are stable against oxidation which tends to cause brittleness and other losses of desired physical properties.

These and other objects are accomplished by incorporating into a hydrocarbon composition between 0.001% and 5% by weight of a phenothiazine having the formula

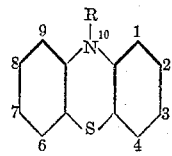

where R is a member of the class consisting of a benzyl group and a substituted benzyl group.

It is critical that the group R, which is bonded to the nitrogen (in the 10-position) be either a benzyl group or a substituted benzyl group, and the benzyl group is preferred. Substituted benzyl groups have substitutions on the aromatic portion of the benzyl group which may be alkyl groups such as methyl or ethyl groups. It is also permissible to have alkyl groups such as methyl or ethyl groups in positions 1 to 4 or 6 to 9 in the formula above. Thus it is seen, that the additive in this invention must be a 10-benzyl phenothiazine with alkyl substitutions being permissible in the aromatic portions of both the benzyl group and the phenothiazine constituents of the molecule.

The phenothiazine derivatives of the present invention are generally used in an amount between .0001% and 5% by weight based on the weight of the whole composition. Preferably, the amounts are between 0.1% and 0.5% by weight in hydrocarbon polymers such as polyethylene and polypropylene, and between 0.2% and 2% by weight in hydrocarbon oils such as lubricating oils. The phenothiazine derivatives of this invention may be used in conjunction with any other known additive for the particular hydrocarbon composition used.

The hydrocarbons most applicable to the present invention are polymers of 1-olefins having from 2 to 5 carbon atoms made by a low pressure polymerization process.

As mentioned above the phenothiazine derivatives of the present invention are particularly useful when employed in polymeric hydrocarbon substances formed from olefins such as ethylene or propylene, particularly those which have been prepared by the so-called low pressure process. A low pressure process involves the catalytic polymerization of the olefin at pressures below 500 atmospheres and the expression "low pressure" is thus used to distinguish the process broadly from known ethylene polymerization processes which are carried out at pressures in the neighborhood of 1,000 atmospheres or more. Examples of the catalysts which can be used in the low pressure processes are as follows:

(I) The Ziegler catalyst, which term in this specification is intended to mean a catalyst formed by mixing at least one A component with at least one B component as hereinafter defined.

An A component is defined as a compound of a metal of groups 4a, 5a, 6a, 7a or 8 of the periodic classification and a B component is defined as an element or compound of the following kind:

(1) A group 1, 2 or 3 metal, zinc or aluminum or an alloy thereof; or (2) An organo-metallic compound or a hydride of a group 1, 2 or 3 metal, tin or lead; or (3) An organic boron compound or an addition complex thereof.

In accordance with current practice the term "organo-metallic compound" means a compound (other than an inorganic metal carbide) in which the metal is directly attached to a carbon atom. The organo-metallic compound or hydride may be in the form of a molecular compound with an ether, thioether or amine or a complex compound with an alkali metal hydride, alkali metal alkyl, alkali metal aryl or alkali metal halide. The addition complex of the organic boron compound may be a complex compound of an alkali metal hydride with a boron compound of the general formula BF′R″R‴, in which R′, R″ and R‴ represent hydrocarbon radicals, alkoxy or aryloxy groups or hydrogen atoms.

Preferably the B component of the catalyst or at least one of the B components where a plurality of B components is employed in an organo-metallic compound in which a hydrocarbon radical (preferably an alkyl radical) is attached to the metal, and in the case of those organo-metallic compounds which are derived from polyvalent metals the remaining valency or valencies of the metal is or are satisfied by hydrocarbon radicals, alkoxy or aryloxy radicals, halogen atoms or hydrogenations. Preferably the A component of the catalyst or at least one of the A components where a plurality of A components is employed is an inorganic halogen-containing compound of a metal of groups 4a, 5a, 6a, 7a or 8.

Particular examples of Ziegler catalysts include those formed by mixing at least one component A comprising an inorganic halide of a metal of groups 4a, 5a, 6a or 7a and particularly of groups 4a, 5a and 6a and more particularly of group 4a of the periodic table such for example as a titanium tetra- and/or tri-halide, with at least one component B comprising either:

(1) An aluminum trialkyl; or (2) An aluminum compound of the general formula $R_1R_2AlX$, wherein $R_1$ and $R_2$ are similar or dissimilar and each represents a hydrogen atom or a hydrocarbon radical such as an alkyl, alkaryl, aryl, aralkyl, alkenyl, alkynyl, cycloalkyl, or cycloalkenyl radical and X represents a hydrogen atom, a halogen atom, an alkoxy group or an aryloxy group or the residue of a secondary amine or amide, mercaptan, thiophenol, carboxylic acid or sulphonic acid; or (3) An aluminum compound of the general formula $RAlX_1X_2$, wherein R represents a hydrogen atom or a hydrocarbon radical as in (2) above, and $X_1$ and $X_2$ are similar or dissimilar and each represents a halogen atom, an alkoxy group or an aryloxy group.

Such catalysts are referred to for example in British Patent No. 799,823.

(II) A mixture comprising aluminum trichloride, titanium tetrachloride, and aluminum powder.

(III) Chromoxide on a 90% silica-10% alumina support such as that shown in U.S. Patent 2,825,721. Other ratios of silica and alumina may be used, and, if desired, the catalyst may be stabilized with strontium oxide.

(IV) An oxide of a metal of the VI group of the periodic system on a support if desired in the presence of an alkali metal.

The present invention is particularly applicable to polyethylenes and polypropylenes made by using a catalyst of the Ziegler type as for example by mixing aluminum triethyl or triisobutyl or aluminum diethyl monochloride with titanium tetrachloride, the present invention being particularly applicable to polyethylene produced in this way and herein after referred to as Ziegler polyethylene. As is well known, Ziegler polyolefins are solid polymers of substantially linear structures. Such polyolefins, in common with most synthetic polymers, may undergo degradation and discoloration in use (e.g. as the result of exposure to light) or in a subsequent processing for example when subjected to milling or other working at elevated temperature, i.e. temperatures above 100° C.

A considerable number of compounds are already known as additives for polymeric compositions based on many of the synthetic polymers now available of other types then polyolefins, which compounds, known as non-staining antioxidants, impart to such compositions resistance to degradation under the conditions indicated without causing noticeable coloration. In the case of ethylenic polymers produced from the lower olefins by the low pressure process, however, an appreciable number of these known additives have been tested, but it has been found that many of the known additives function in an unexpected manner in that, although they may reduce degradation, they also cause marked color formation. Thus when such additives are present in polymeric materials such as Ziegler polyethylene, there is often pronounced discoloration on working the material at for example 160° C. and sometimes even almost immediately on addition of the additive. However, the phenothiazine derivatives of the present invention, and in particular 10-benzylphenothiazine is effective in arresting degradation and discoloration of such compounds especially low pressure polyethylene at elevated temperatures. Moreover it is particularly effective in preventing degradation of such hydrocarbon polymers on prolonged exposure to light.

The invention is described in more detail in the following illustrative examples:

EXAMPLE I

Polymeric materials comprising polyethylene made with a Ziegler catalyst were formed into sheets by milling the polyethylene for various periods of time on a two-roll mill with a milled surface temperature of approximately 160° C. and subsequently pressing the sheeted material in a press which was heated to about 150° C. Various antioxidants were incorporated in the polyethylene in an amount of 0.1% by weight, and the results are shown in Table I below. In this way 10-benzylphenothiazine was compared with various conventional antioxidants. The color ratings of the samples were determined by a standard reflectivity test and are based on a rating of 100 for a standard white disc. The intrinsic viscosities of the various samples of polyethylene were determined on a 0.1% solution in decalin at 120° C. The I.V. (intrinsic viscosity) of the material after heat rolling provides an indication of the degree of degradation. The melt index of each sample was also determined.

*Table I*

| Antioxidant | Color Time of milling | | | Melt Index Time of milling | | | I.V. Time of milling | | |
|---|---|---|---|---|---|---|---|---|---|
| | 0 mins. | 30 mins. | 60 mins. | 0 mins. | 30 mins. | 60 mins. | 0 mins. | 30 mins. | 60 mins. |
| 10-benzyl-phenothiazine | 84 | 81 | 75 | | 0.42 | 0.48 | 2.03 | 2.01 | 2.14 |
| None | 85 | 78 | 77 | 0.34 | 0.28 | 0.14 | 2.25 | 1.80 | 18.4 |
| Oxycresyl camphane | 67 | 58 | 50 | | | | | | |
| Nonoxyl DCP | 43 | 45 | 41 | | | | | | |

From Table I above, it is seen that conventional antioxidants suffered considerable loss in color rating whereas the polyethylene containing 10-benzylphenothiazine suffered little loss in rating and remained substantially as good as the polyethylene with no additive. On the other hand, the polyethylene with no additive suffered a considerable loss of I.V. during only an hour of milling while the polyethylene containing 10-benzylphenothiazine retained its high I.V.

EXAMPLE II

An oil solution was prepared comprising a solvent refined oil finished with acid and earth treatment and having a high V.I. containing 1.45% by weight of 10-benzylphenothiazine. The solution was left in a clear, stoppered glass tube in full daylight for five weeks and the condition of the oil solution at the end of this period noted. For the purposes of comparison similar oil solutions containing other phenothiazine derivatives were prepared in the same way and exposed to light under the same conditions. The results obtained are shown in Table II below.

*Table II*

| Additive | Period of storage | Condition of sample |
|---|---|---|
| 1.45% wt. 10-benzylphenothiazine. | 5 weeks | No ppt. color 1½+(NPA) |
| 1.64% wt. 10-nonylphenothiazine. | ...do... | Heavy black ppt. |
| 0.25% wt. 1:2 benzophenothiazine. | 1 week | Moderate black ppt. |
| 1.72% wt. 3-nonoxyphenothiazine. | 5 weeks | Very heavy black ppt. |
| 0.25% phenothiazine | ...do... | Do. |
| 0.5% wt. PαN | 4 weeks | Black, ppt NPA 3½. |
| 0.5% wt. PβN | ...do... | Light black ppt., NPA 3. |

NPA=National Petroleum Association color numbers as determined by the ASTM standard method. These results show that phenothiazine and most of its derivatives do not possess good light stability whereas 10-benzylphenothiazine does possess good light stability.

The data in Table II graphically illustrates the superiority of 10-benzylphenothiazine over phenolthiazine and some of its derivatives in regard to color stability. Most noteworthy is the failure of 10-nonylphenothiazine to retain color, because this compound would ordinarily be expected to be somewhat similar to 10-benzylphenothiazine.

We claim as our invention:

1. A composition consisting essentially of a solid substantially linear polyolefin prepared by polymerization in the presence of a Ziegler type catalyst and between 0.001% and 5% of a phenothiazine having the formula

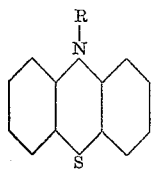

wherein R is a member of the group consisting of a benzyl group, a methylbenzyl group and an ethylbenzyl group.

2. The composition of claim 1, in which the polyolefin is polyethylene.

3. The composition of claim 1, in which the polyolefin is polypropylene.

4. The composition of claim 1, in which R is a benzyl group.

5. The composition of claim 1, in which the phenothiazine is present in an amount of from 0.1% to 0.5% by weight.

References Cited in the file of this patent

UNITED STATES PATENTS

| | | |
|---|---|---|
| 2,006,756 | Bartram | July 2, 1935 |
| 2,843,577 | Friedlander et al. | July 15, 1958 |
| 2,848,444 | Brugmann et al. | Aug. 19, 1958 |
| 2,868,764 | Hirsty | Jan. 13, 1959 |

OTHER REFERENCES

Atkins et al.: Development of Additives and Lubricating Oil Composition," I. and E. Chem., vol. 39, No. April 1947, pages 491–497.

Murphy et al.: "Mode of Action of Phenothiazine Type Antioxidants," Industrial and Engineering Chemistry, vol. 42, pp. 2479–2489, December 1950.